US009073161B2

(12) United States Patent
Tseng

(10) Patent No.: US 9,073,161 B2
(45) Date of Patent: Jul. 7, 2015

(54) DUST-COLLECTING DEVICE FOR POWER DRILL

(76) Inventor: Kuan-Li Tseng, Taichung (TW)

(*) Notice: Subject to any disclaimer, the term of this patent is extended or adjusted under 35 U.S.C. 154(b) by 389 days.

(21) Appl. No.: 13/392,425

(22) PCT Filed: Nov. 18, 2010

(86) PCT No.: PCT/CN2010/078855
§ 371 (c)(1),
(2), (4) Date: Aug. 17, 2012

(87) PCT Pub. No.: WO2012/034311
PCT Pub. Date: Mar. 22, 2012

(65) Prior Publication Data
US 2012/0308320 A1 Dec. 6, 2012

(51) Int. Cl.
*B25D 17/14* (2006.01)
*B23Q 11/00* (2006.01)

(52) U.S. Cl.
CPC ........... *B23Q 11/0053* (2013.01); *Y10T 408/50* (2015.01); *B23Q 11/0071* (2013.01)

(58) Field of Classification Search
CPC .......................... B23Q 11/005; B23Q 11/0071
USPC ........................................................... 408/67
IPC ........................................................ B25D 17/14
See application file for complete search history.

(56) References Cited

U.S. PATENT DOCUMENTS

| 2,792,199 | A | * | 5/1957 | Becker et al. | 175/211 |
| 2,828,108 | A | * | 3/1958 | Hood et al. | 175/211 |
| 3,583,821 | A | * | 6/1971 | Shaub et al. | 408/72 R |
| 3,776,647 | A | * | 12/1973 | Hart | 408/241 G |
| 3,907,452 | A | * | 9/1975 | Tripp | 408/56 |
| 4,245,437 | A | * | 1/1981 | Marton | 451/456 |
| 4,251,171 | A | * | 2/1981 | Brett | 408/67 |
| 6,457,915 | B1 | * | 10/2002 | Kao | 408/67 |
| 6,503,029 | B1 | * | 1/2003 | Ende et al. | 408/1 R |
| 7,033,359 | B2 | * | 4/2006 | Meller | 606/80 |
| 7,175,371 | B2 | * | 2/2007 | Vidal | 408/1 R |
| 7,322,429 | B2 | * | 1/2008 | Kim | 173/198 |
| 7,465,132 | B2 | * | 12/2008 | Gipson | 409/137 |
| 7,549,826 | B2 | * | 6/2009 | Videtto | 408/1 R |
| 7,740,086 | B2 |   | 6/2010 | Bleicher et al. | |

(Continued)

FOREIGN PATENT DOCUMENTS

| AU | 2007100367 | 6/2007 |
| CN | 2135433 | 6/1993 |

(Continued)

*Primary Examiner* — Eric A Gates
(74) *Attorney, Agent, or Firm* — Muncy, Geissler, Olds & Lowe, P.C.

(57) ABSTRACT

A dust-collecting device adaptive to a power drill comprises a container having atop a tapered portion, the tapered portion including an opening, the container having a through hole at bottom, and a positioning seat being raised around the through hole; a shaft assembly passing through the through hole, the shaft assembly having at least one bearing received in the positioning seat; a spring member being mounted around the shaft assembly; and a spacing member being coupled to one end of the spring member, the spacing member having a round hole for a bit of the power drill to pass therethrough and then pass through the shaft assembly and the opening, whereby, when the power drill drills, drill dust thus generated is guided by a taper of the tapered portion and converged in the container.

8 Claims, 6 Drawing Sheets

(56) References Cited

U.S. PATENT DOCUMENTS

| | | | |
|---|---|---|---|
| 7,901,164 B2 * | 3/2011 | Skradski et al. | 408/67 |
| 2007/0243031 A1 * | 10/2007 | Yun | 408/67 |
| 2013/0094915 A1 * | 4/2013 | Chen | 408/67 |

FOREIGN PATENT DOCUMENTS

| CN | 2685557 | | | 3/2005 | |
|---|---|---|---|---|---|
| CN | 2902537 | Y | * | 5/2007 | |
| CN | 103182702 | A | * | 7/2013 | |
| DE | 2434641 | A | * | 1/1976 | |
| DE | 3129375 | A1 | * | 4/1983 | B23B 45/00 |
| DE | 3605204 | A1 | * | 8/1987 | B23B 45/00 |
| DE | 3737024 | A1 | * | 6/1988 | B28D 1/14 |
| DE | 3734127 | A1 | * | 4/1989 | B23Q 11/02 |
| DE | 4000172 | A1 | * | 7/1991 | B08B 15/00 |
| EP | 2363237 | A2 | * | 9/2011 | |
| FR | 2324401 | A | * | 3/1977 | |
| GB | 2096029 | A | * | 10/1982 | B23B 47/34 |
| JP | 2002219671 | | | 8/2002 | |
| JP | 2002219671 | A | * | 8/2002 | |
| JP | 2007210324 | A | * | 8/2007 | |
| WO | WO 2007134759 | A1 | * | 11/2007 | |

* cited by examiner

DUST-COLLECTING DEVICE FOR POWER DRILL

BACKGROUND OF THE INVENTION

1. Technical Field

The present invention relates to accessories for power tools, and more particularly, to a dust-collecting device that is configured to be detachably assembled to a power drill for collecting drill dust. The dust-collecting device is advantageous because it can fit power drills of various specifications without changing them structurally, and it is compact, easy to use and simplified in structure.

2. Description of Related Art

Power drills have been widely used in industry and upholstery to drill walls for facilitating installation of wires and fasteners and to drill ceilings for facilitating installation of ceiling lamps and ceiling fans. Drilling with power drills unavoidably generates drill dust. For collecting such drill dust, some commercially marketed power drills are equipped with a plug-in dust-collecting device that works as a vacuum cleaner and has a dust pipe connected between the drill bit and a dust case or bag.

While such an existing dust-collecting device does work for its purpose, substantial structural modification of the power drill is required to power it. In addition, it is in nature structurally complex and, therefore, heavy and bulky. Theses disadvantages make it expensive and less portable. As a result, users would rather use simple dust covers than the conventional power dust-collecting device. However, these blanket-like dust covers are unable to prevent dust from being blown about and polluting air.

SUMMARY OF THE INVENTION

The primary objective of the present invention is to provide a dust-collecting device adaptive to a power drill. The dust-collecting device should be made to be structurally simple, compact and light in weight, so is very portable and usable. It should also provide improved dust-collecting efficiency and can be manufactured with reduced costs.

To this end, according to the present invention, a dust-collecting device comprises:

a container having atop a tapered portion, the tapered portion including an opening, the container having a through hole at bottom, and a positioning seat being raised around the through hole;

a shaft assembly passing through the through hole, the shaft assembly having at least one bearing received in the positioning seat;

a spring member being mounted around the shaft assembly; and a spacing member being coupled to one end of the spring member, the spacing member having a round hole for a bit of the power drill to pass therethrough and then pass through the shaft assembly and the opening, whereby, when the power drill drills, drill dust thus generated is guided by a taper of the tapered portion and converged in the container.

Therein, the container is transparent.

Therein, the container comprises a base and a cover combined with each other, the tapered portion being at a top of the cover, and the through hole being formed on the base.

Therein, the positioning seat has a bottom formed with a plurality of internal teeth for retaining and positioning the bearing.

Therein, at least one sleeve is mounted around the shaft assembly, the sleeve containing an elastic pad, and the elastic pad having a plurality of cut-through lines that intersect with each other at a center of the elastic pad, in which each said cut-through line does not run to an edge of the elastic pad, so that the elastic pad provides a fitting channel for the bit to pass and be gripped.

Therein, the shaft assembly has at least one threaded segment for engaging with the sleeve in a screwing manner.

Therein, the sleeve is provided in a number of two, and the two sleeves are provided at two ends of the shaft assembly, in which the sleeve near the spring member is tailed with an extended tube for one end of the spring member to be mounted therearound.

Therein, an opposite end of the spring member is mounted around a coupling tube extended from the spacing member.

Therein, each of the extended tube and the coupling tube is provided with a threaded segment.

Therein, the spacing member is a rectangular board.

With the configuration described above, the present invention is expected to provide the following technical effects:

1. When the container is pressed on a wall or a ceiling, as a result of drilling operation of the power drill, the spring member is compressed to offset the forward movement of the bit and the spacing member, so the container stays still to allow the drill dust to enter the container through the opening and assemble together in the container following the taper of the tapered portion. This prevents the drill dust from leaking and flying out.

2. The bearing makes the rotation of the bit independent of the container. This is advantageous because the drill dust collected in the container will not be thrown out under centrifugal force, and friction between the container and the wall/ceiling that otherwise happens can be eliminated, thereby preventing the container from being damaged and preventing the wall/ceiling from being worn.

3. The two elastic pads are provided with the cut-through lines that intersect with each other at a center of the elastic pad, in which each said cut-through line does not run to an edge of the elastic pad, so that the elastic pads can be resiliently biased open at the centers thereof. When the bit is inserted, the elastic pads allow the bit to pass and then grip it. The elastic pads serve to not only block dust, but also provide balance between the bit and the container, so as to prevent unbalance that causes the container to sway and in turn deteriorates dust-collecting efficiency.

4. The cut-through lines of the elastic pads make the disclosed dust-collecting device adaptive to power drills and bits from various manufacturers and of various sizes, so the dust-collecting device is utility. This also benefits manufacturers because they no more need to provide specific dust-collecting devices for different power drills and bits, and thus save manufacturing costs.

5. The combination of the power drill and the dust-collecting device can be turned downward as a whole for expelling the dust. At this time, the gripping force acting on the bit from the elastic pads can hold the dust-collecting device from falling downward.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

The following preferred embodiments when read with the accompanying drawings are made to clearly exhibit the above-mentioned and other technical contents, features and effects of the present invention. However, the accompanying drawings are intended for reference and illustration, but not to limit the present invention and are not made to scale. Unless otherwise noted, like elements will be identified by identical numbers throughout all figures.

Figure 1:
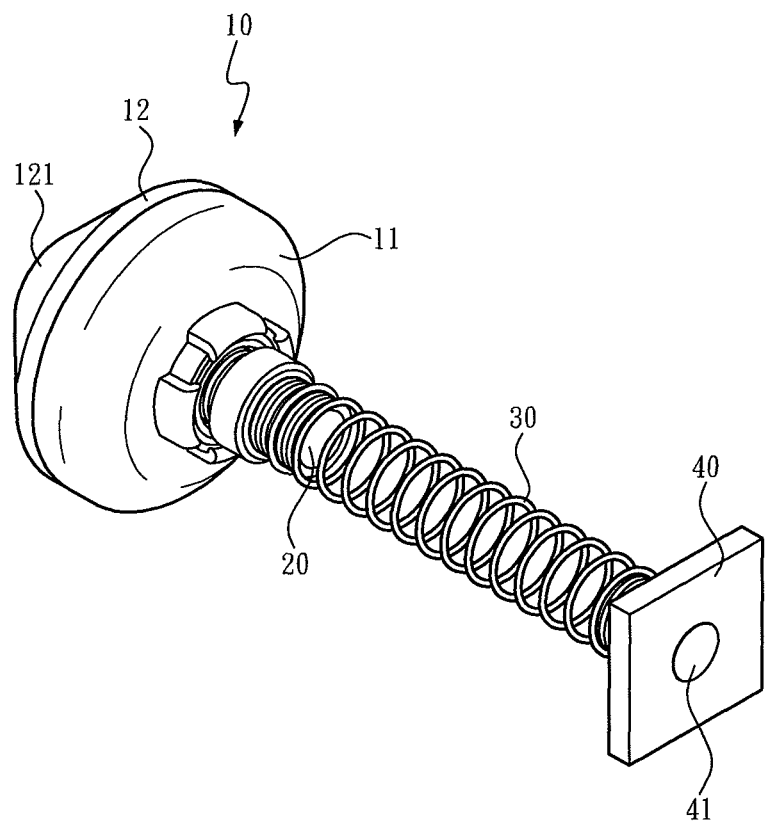
FIG. 1 is a perspective view of one embodiment of the present invention.
Figure 2:
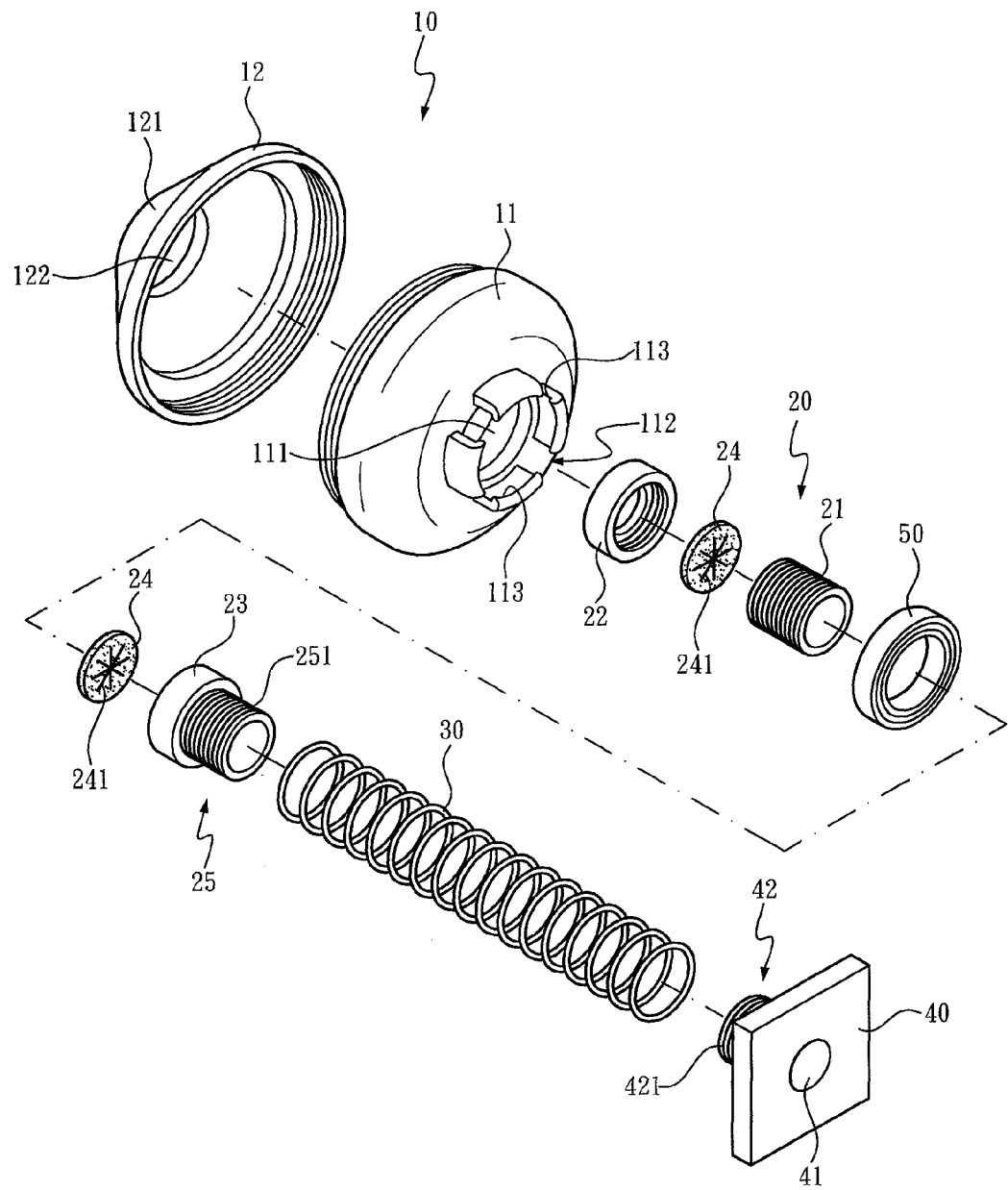
FIG. 2 is an exploded view of the embodiment of FIG. 1.
Figure 3:
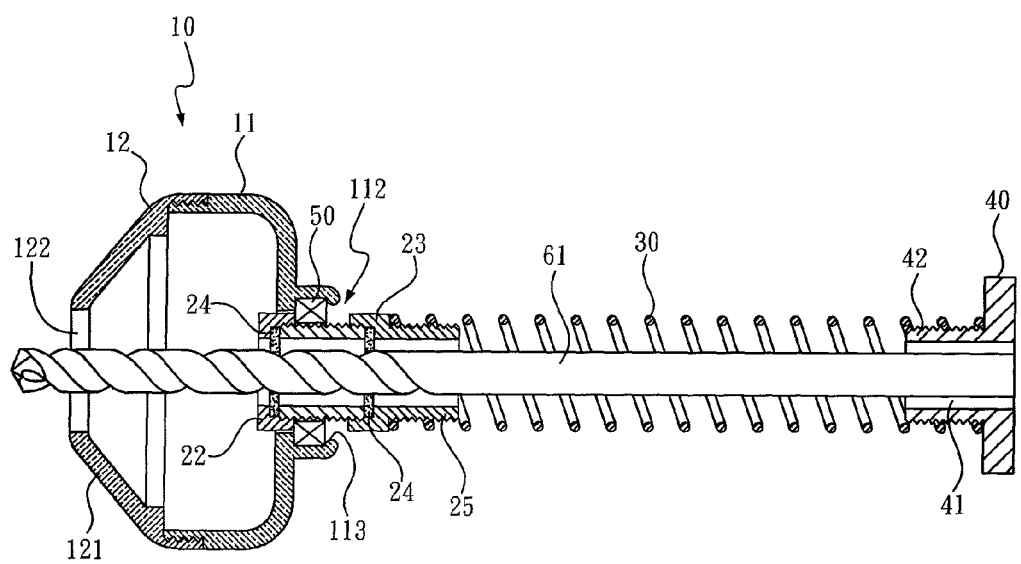
FIG. 3 is a cross-sectional view of the embodiment of FIG. 1 mounted onto a power drill bit.
Figure 4:
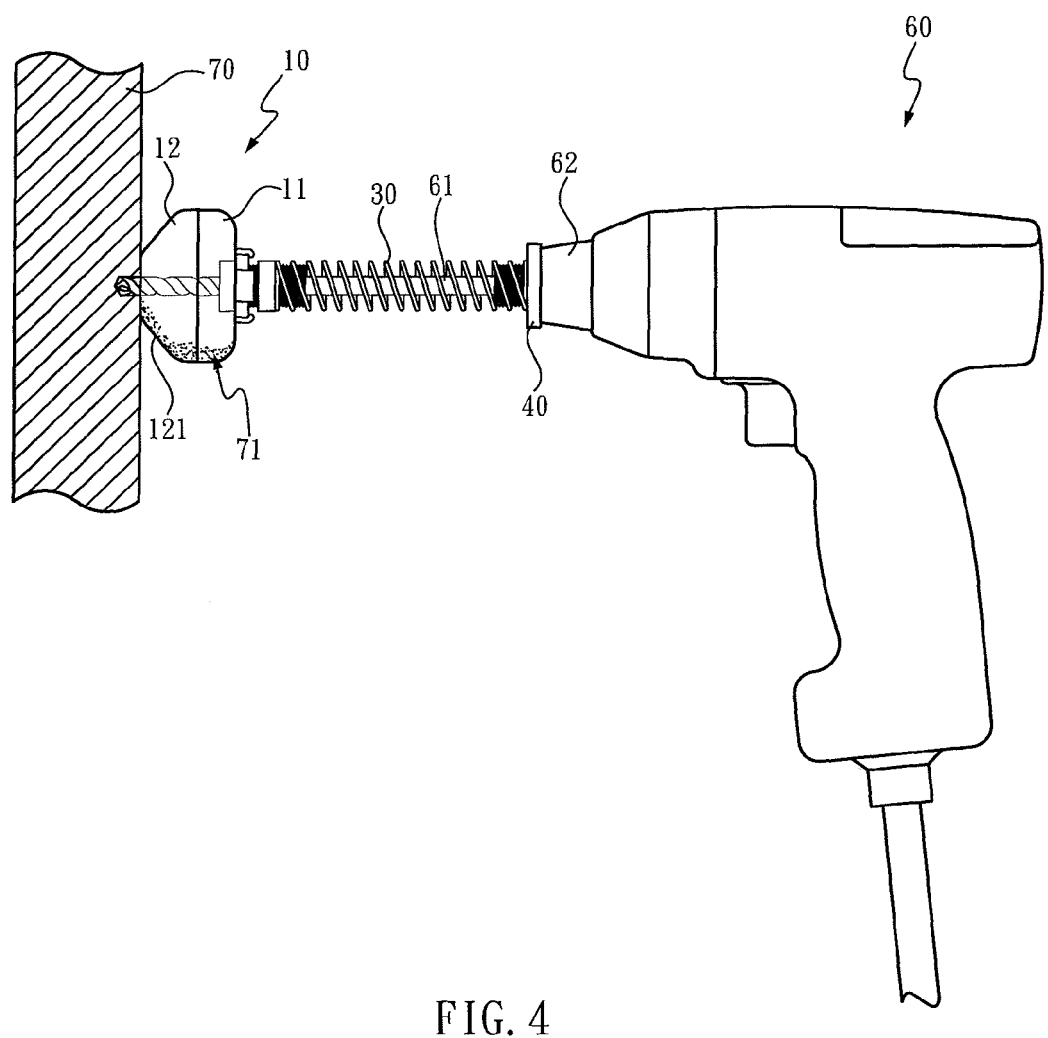
FIG. 4 and FIG. 5 depict one application of the present invention.

Referring to FIG. 1 through FIG. 3, according to the present invention, a dust-collecting device is adaptive to a power drill 60 (as shown in FIG. 4) for collecting drill dust. The dust-collecting device primarily comprises a container 10, a shaft assembly 20, a spring member 30, and a spacing member 40, all for a bit 61 of the power drill 60 to pass therethrough.

The container 10 is transparent so as to make the bit 61 and the site to be drilled observable. The container 10 is composed of a base 11 and a cover 12 combined with each other. The way in which the base 11 and the cover 12 are combined may include, without limitation, screw means and snap-in means. The base 11 has a disk-like shape, with its bottom formed with a through hole 111. A positioning seat 112 is raised from the periphery of the through hole 111. The positioning seat 112 may be integratedly formed with the base 11, or may be attached to surround the through hole 111. The positioning seat 112 has a lower end formed with a plurality of internal teeth 113. The cover 12 has a cone-like shape, with its top formed with a tapered portion 121 on which an opening 122 is provided. The opening 122 has a diameter greater than the maximum diameter of the existing drill bits.

The shaft assembly 20 to be assembled to the through hole 111 is provided with at least one threaded segment 21. The shaft assembly 20 also includes two sleeves 22, 23 coupled with two ends of the threaded segment 21 in a screwing manner. In each of the sleeves 22, 23, an elastic pad 24 is inserted. The elastic pad 24 may be made of rubber, and has plural cut-through lines 241 that intersect with each other at the center of the elastic pad 24 and form a star-like pattern. It is to be noted that each said cut-through line 241 does not run transversely through the elastic pad 24, meaning that it does not reach any edge portion of the elastic pad 24. The cut-through lines 241 such arranged allow the elastic pad 24 to open centrally. The sleeve 23 relatively distant from the container 10 is tailed with an extended tube 25 that has at least one threaded segment 251. The way in which the sleeve 23 and the extended tube 25 are combined may include, without limitation, screw means and integral formation. The shaft assembly 20 further has at least one bearing 50 located between the sleeves 22, 23 and received in the positioning seat 112, so that the bearing 50 is retained and positioned within the positioning seat 112 by the internal teeth 113.

The spring member 30 is a lengthwise compression spring with its front end mounted around the extended tube 25. With the aid of the threaded segment 251, the spring member 30 is secured on the extended tube 25.

The spacing member 40 is a rectangular board for being attached to a chuck 62 of the power drill 60 (as shown in FIG. 4). The spacing member 40 is provided with a round hole 41 around which a coupling tube 42 is extended. The coupling tube 42 has at least one threaded segment 421 for receiving an end of the spring member 30 opposite to the extended tube 25. This threaded segment 421 has the same function as the threaded segment 251 of the extended tube 25 has. The round hole 41 allows the bit 61 to pass therethrough and sequentially pass through the above-recited components. The cut-through lines 241 allow the elastic pads 24 to be resiliently biased open at the centers thereof and thereby grip the bit 61, so that the elastic pads 24 can hold the bit 61 despite its size. The spacing member 40 separates the spring member 30 from the drill chuck 62, thereby preventing the two components from contacting and getting entangled with each other. In addition, the elastic pads 24 serve to not only block dust, but also provide balance between the bit 61 and the container 10, so as to prevent unbalance that causes the container 10 to sway and in turn deteriorates dust-collecting efficiency.

With the understanding of the foregoing configuration, one skilled in the art would comprehend the operation and working principles of the present invention through the following description.

Figure 5:
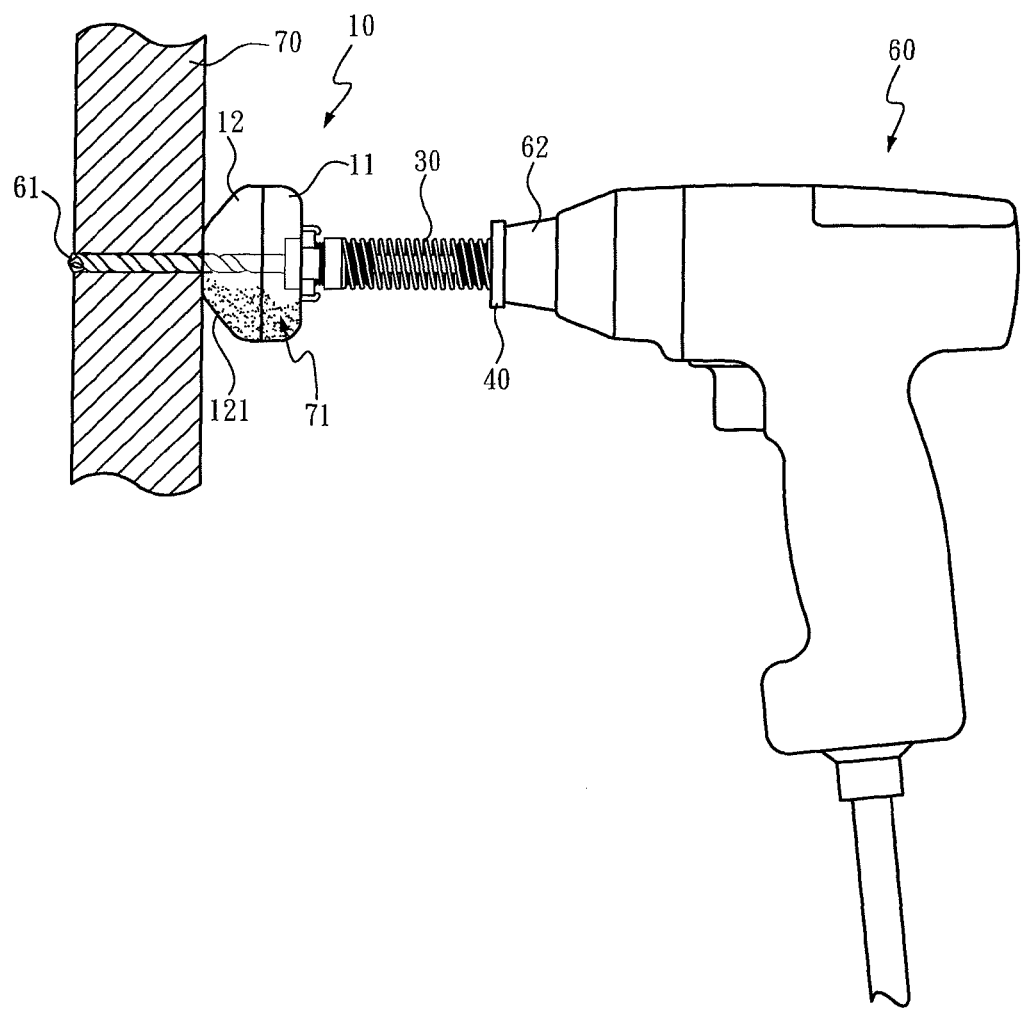

As shown in FIG. 4 and FIG. 5, in a horizontal operation in which an upright wall 70 is drilled, the cover 12 is first pressed on the wall 70, and the bit 61 can be rapidly aligned with the site to be drilled because the container 10 is transparent and can be seen through. As the power drill 60 drills, the spring member 30 is compressed to offset the forward movement of the bit 61 and the spacing member 40 so as to make the cover 12 "stay put". The drill dust 71 entering the container 10 through the opening 122 can be guided by the taper of the tapered portion 121 to converge and thereby secured from flying out.

Figure 6:
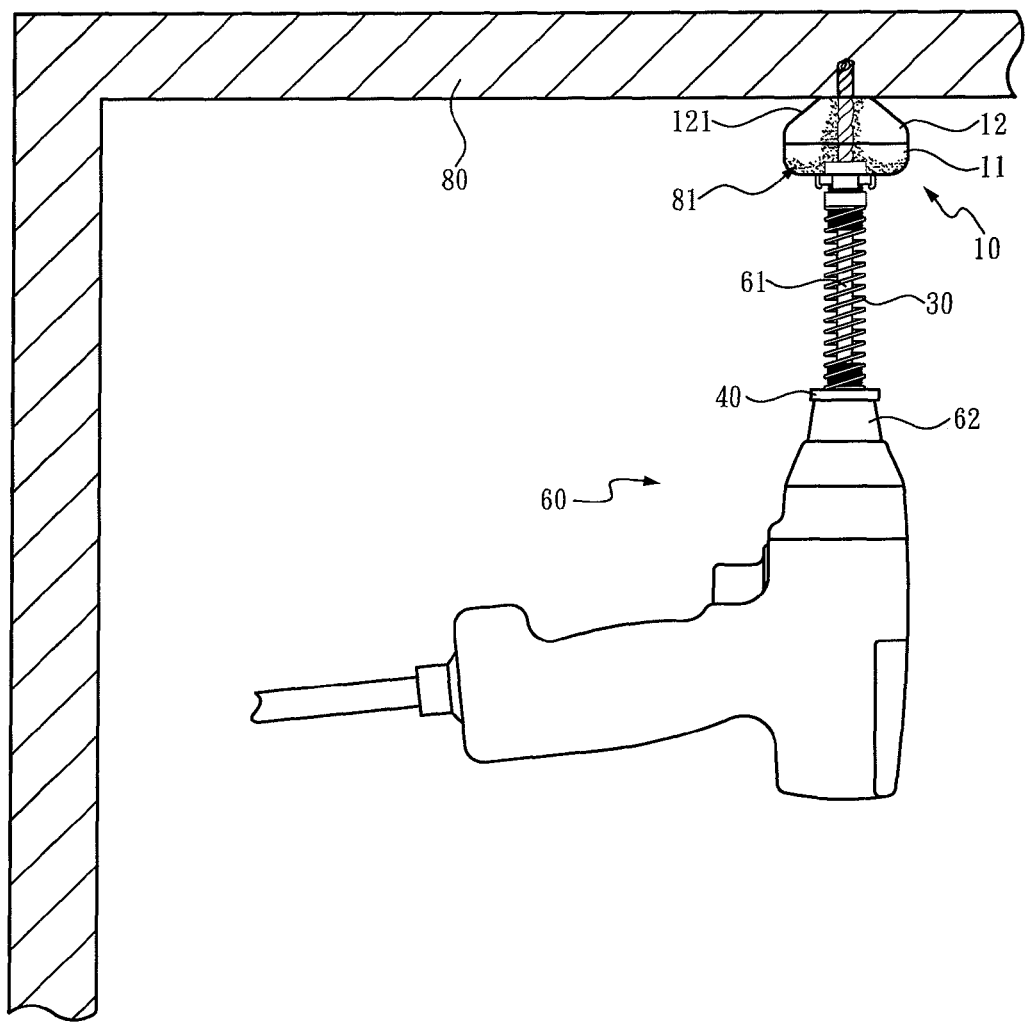
FIG. 6 depicts another application of the present invention.

As shown in FIG. 6, in a vertical operation in which a ceiling 80 is drilled, the drill dust 81 can vertically fall into the container 10 through the opening 122. In virtue of the bearing 50, the rotating bit 61 rotates all of the associated components but not the container 10. This is advantageous because the drill dust 71, 81 collected in the container 10 will not be thrown out under centrifugal force, and friction between the container 10 and the wall 70/ceiling 80 that otherwise happens can be eliminated, thereby preventing the container 10 and the wall 70/ceiling 80 from being worn.

After the drilling operation, the container 10 can be cleaned by first removing the dust-collecting device from the bit 61, and evacuating the drill dust 71, 81 through the opening 122 or opening the cover 12 and then pouring out the drill dust 71, 81 between the cover 12 and the base 11. Alternatively, the combination of the power drill 60 and the dust-collecting device can be turned downward as a whole. In such case, the cut-through lines 241 of the elastic pads 24 can firmly hold the bit 61 to block the dust 71, 81 from leaking outward. Also, the gripping force acting on the bit 61 can hold the dust-collecting device from falling down in the process of evacuating the drill dust 71, 81. Additionally, the rectangular shape of the spacing member 40 prevents the dust-collecting device from rolling when it is laid flat.

As can be learned from the foregoing description, the disclosed dust-collecting device can be easily assembled and disassembled without using any tools. The container 10 is streamlined and compact, making the disclosed dust-collecting device more manageable. Besides, the transparent container 10 facilitates pre-drilling alignment and allows easy observation of the level of the dust 71, 81 therein, so its operation and cleaning are more convenient. Moreover, since the disclosed dust-collecting device can fit power drills and bits from various manufacturers and of various sizes, it is utility. This also benefits manufacturers because they no more need to provide specific dust-collecting devices for different power drills and bits, and thus save manufacturing costs.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A dust-collecting device being adaptive to a power drill and comprises:
    a container having a tapered portion, the tapered portion including an opening, the container having a through hole at bottom, and a positioning seat being raised around the through hole;
    a shaft assembly passing through the through hole, the shaft assembly having at least one bearing received in the positioning seat;
    a spring member being mounted around the shaft assembly; and
    a spacing member being coupled to one end of the spring member, the spacing member having a round hole for a bit of the power drill to pass therethrough and then pass through the shaft assembly and the opening,
    wherein at least one sleeve is mounted around the shaft assembly, the sleeve containing an elastic pad, and the elastic pad having a plurality of cut-through lines that intersect with each other at a center of the elastic pad, in which each said cut-through line does not run to an edge of the elastic pad, so that the cut-through lines allow the elastic pad to be resiliently biased open at the center thereof and thereby grip the bit, and the shaft assembly has at least one threaded segment for engaging with the sleeve in a screwing manner,
    whereby, when the power drill drills, drill dust thus generated is guided by a taper of the tapered portion and converged in the container.

2. The dust-collecting device of claim 1, wherein the container is transparent.

3. The dust-collecting device of claim 1, wherein the container comprises a base and a cover combined with each other, the tapered portion being at a top of the cover, and the through hole being formed on the base.

4. The dust-collecting device of claim 1, wherein the positioning seat has a bottom formed with a plurality of internal teeth for retaining and positioning the hearing.

5. The dust-collecting device of claim 1, wherein the sleeve is provided in a number of two, and the two sleeves are provided at two ends of the shaft assembly, in which the sleeve near the spring member is tailed with an extended tube for one end of the spring member to be mounted therearound.

6. The dust-collecting device of claim 5, wherein an opposite end of the spring member is mounted around a coupling tube extended from the spacing member.

7. The dust-collecting device of claim 6, wherein each of the extended tube and the coupling tube is provided with a threaded segment.

8. The dust-collecting device of claim 1, wherein the spacing member is a rectangular board.

* * * * *